Aug. 1, 1950    B. E. HOUSE    2,516,995
BRAKE
Filed Feb. 28, 1948    2 Sheets-Sheet 2

INVENTOR.
BRYAN E. HOUSE
BY
ATTORNEY

Patented Aug. 1, 1950

2,516,995

UNITED STATES PATENT OFFICE 2,516,995

BRAKE

Bryan E. House, South Bend, Ind., assignor to Bendix Aviation Corporation, South Bend, Ind., a corporation of Delaware Application February 28, 1948, Serial No. 11,950

15 Claims. (Cl. 188—78)

This invention relates to improvements in the construction and arrangement of brakes.

An object of the invention is to simplify and reduce the expensiveness of brakes of the type in which the supporting plate is in the same plane as the shoe webs, by anchoring the shoes directly on the supporting plate without transmitting the anchoring torque through the wheel cylinders, or actuators. This means that the wheel cylinders can be of standard construction, and can be less costly to manufacture than if they had to serve as anchors for the shoes.

A further object of the invention is to provide a brake in which the shoes have a relatively high self-energization factor, owing to the fact that their anchor points have been moved radially inwardly toward the center of the brake.

In general, the foregoing objects are accomplished by providing two "supporting" plates in the brake assembly, one of which actually takes the anchoring load of the shoes, and the other of which provides a mounting for the actuator or actuators.

Figure 1:
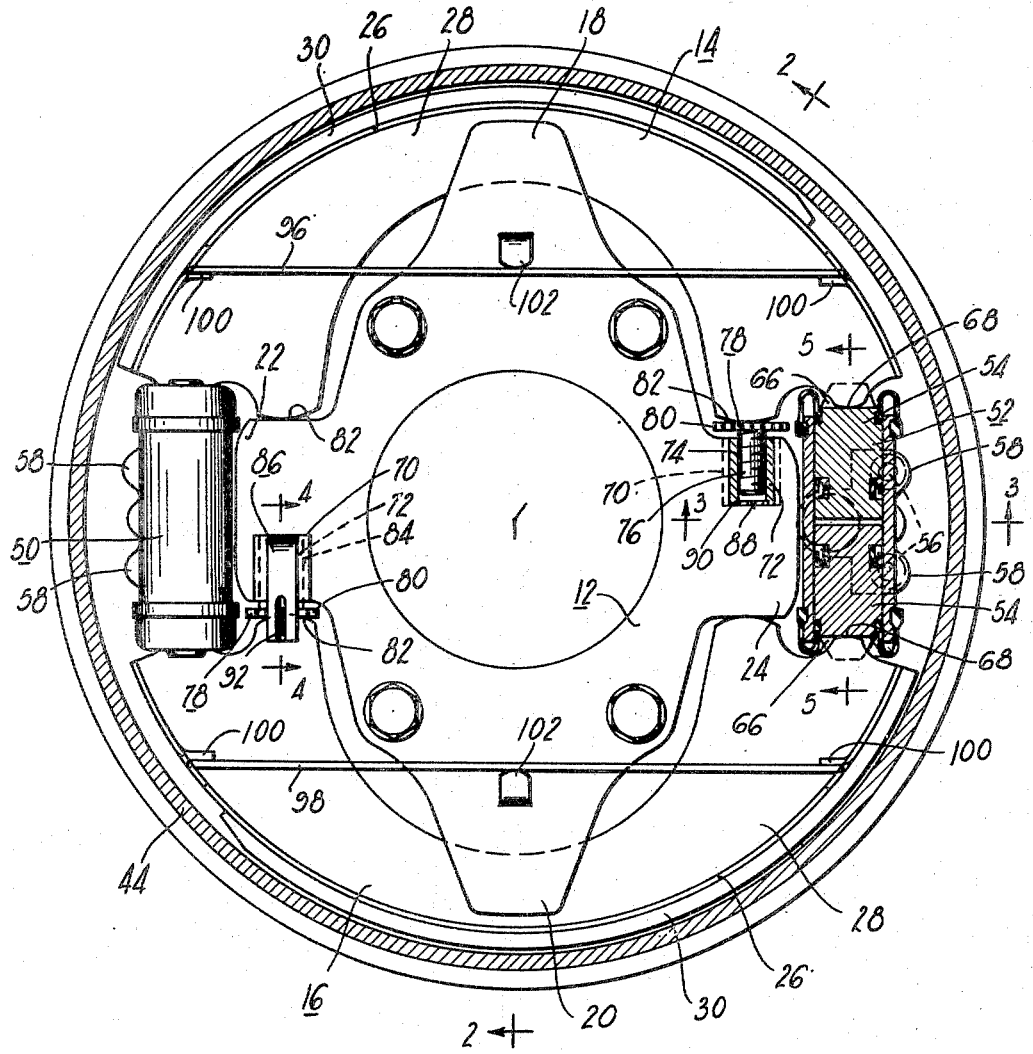
Figure 2:
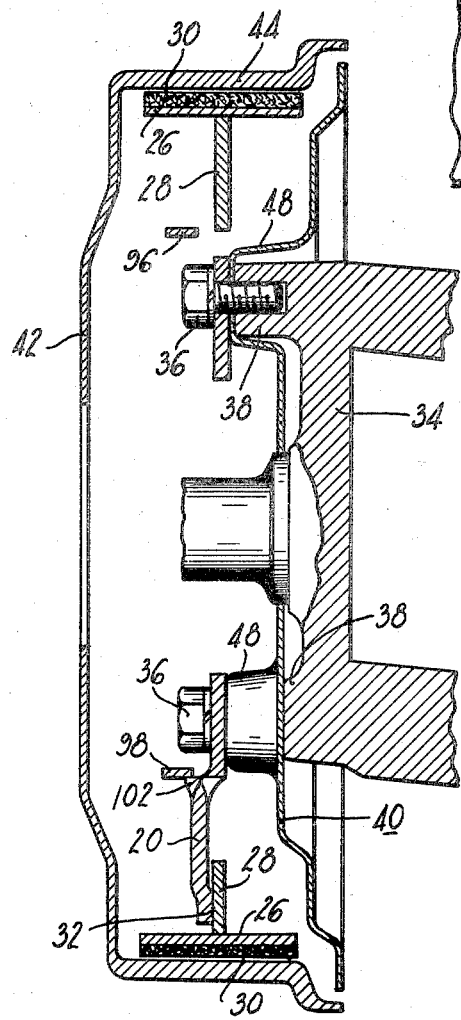
Figure 3:
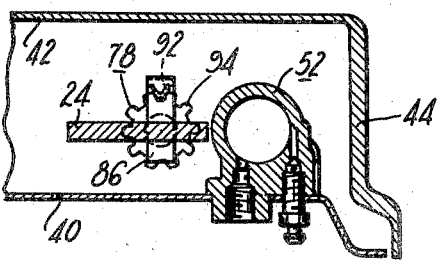
Figure 4:
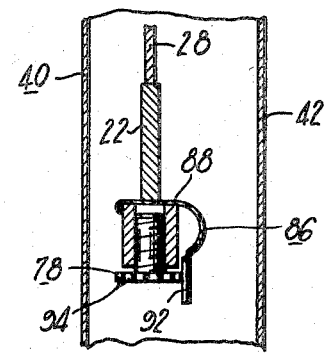
Figure 5:
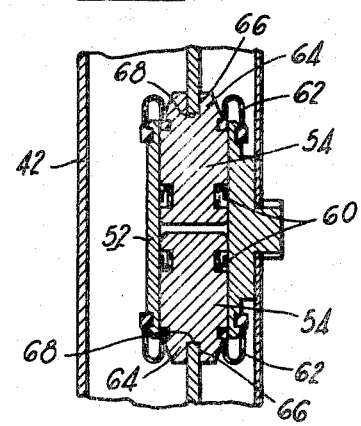

Other objects and advantages of the present invention will become apparent during the following description of an illustrative embodiment of the invention, reference being had therein to the accompanying drawings, in which:

Figure 1 is an elevational view of a brake assembly which incorporates the invention; and Figures 2, 3, 4, and 5 are sections taken on lines 2—2, 3—3, 4—4, and 5—5, respectively, of Figure 1.

As shown in the drawings a substantially flat supporting plate, or spider, 12 is provided, which receives the anchoring torque of the brake shoes 14 and 16. The supporting plate 12 has four radially extending arms, indicated at 18, 20, 22, and 24. Arms 18 and 20, which are slightly offset axially from the plane of the center portion of supporting plate 12, as shown in the lower half of Figure 2, serve as shoe-guiding arms. The shoes are T-shaped in cross-section, having rims 26 and webs 28, the rims being lined with the usual friction material strips 30. The shoe webs 28 engage the surfaces 32 provided on the arms 18 and 20 of supporting plate 12.

Arms 22 and 24 of supporting plate 12 serve as shoe-anchoring arms, against which the ends of the shoes rest in released position, and which receive the anchoring torque of the shoes while the brake is being applied. Supporting plate 12 is secured to a suitable non-rotating member, such as the steering knuckle 34, by means of a plurality of mounting screws 36 which extend into threaded openings provided in bosses 38 formed on the non-rotating member.

A cover plate 40 is also secured to the non-rotatable member, preferably by means of the same fastening members 36 which hold supporting plate 12 in position. The cover plate substantially closes the open side of the brake assembly, the opposite sides of the brake being protected by the brake drum 42, which has a cylindrical braking flange 44 overlying the lined outer surfaces of the brake shoes. A plurality of pockets 48 are formed on the cover plate to fit over the ends of the bosses 38 on non-rotatable member 34.

Two hydraulic wheel cylinders, or actuators, 50 and 52 are secured to cover plate 40. The wheel cylinders 50 and 52 are located at opposite sides of the brake between the ends of the shoes. Reciprocable in each wheel cylinder are two pistons 54, which engage the ends of the brake shoes, and which are arranged to urge the shoes outwardly under the influence of pressure fluid admitted to the wheel cylinders between the pistons. The wheel cylinders are secured to the cover plate by means of mounting screws 56 which extend into bosses 58 provided in the wheel cylinder casings.

Since the wheel cylinders do not receive the anchoring torque of the shoes, their construction and the manner of mounting them can be relatively simple and inexpensive. Suitable hydraulic seals 60 are carried by the pistons 54, and boots 62 are provided at the ends of the wheel cylinders to exclude dirt and other foreign matter. In order to assist in guiding the brake shoes, the outer ends of pistons 54 may be provided with extensions 64 having slots 66 which receive and guide the nibs 68 formed on the ends of the shoe webs.

Each of the shoe anchoring arms 22 and 24 has a notch 70 formed in one side thereof to provide a mounting for a shoe-adjusting member. An internally threaded bushing 72 is mounted in each of the notches 70. The internal threaded surfaces 74 of the bushings engage the stems 76 of adjusting screws 78, which have heads 80 engaging the corresponding anchoring surfaces of the brake shoes. Each brake shoe has two convexly curved anchoring surfaces 82, one of which engages the head of one of the adjusting screws 78, and the other of which is in direct engagement with one side of one of the shoe anchoring arms 22 and 24. It is, of course, understood that one end of each of the shoes leaves its anchor during application of the brake.

In order to prevent rotation of bushings 72 when the adjusting screws 78 are rotated, the bushings have longitudinally extending peripheral slots 84 into which extend the sides of notches 70. Spring lock members 86 are provided to prevent the adjusting screws from rotating, except during the actual adjustment operation. The spring members 86 each have an arm 88 which is held between the bottom of notch 70 and the inner end of the respective bushing 72, said arm 88 being prevented from turning by engagement with a shallow notch 90 formed on the bottom of the bushing. Each of the spring members 86 also has an arm 92 which resiliently engages the serrated surface 94 of the adjusting screw head 80. Suitable return springs 96 and 98 are arranged to bias the brake shoes to released position, or, in other words, to normally hold the shoes in engagement with the anchoring surfaces provided by supporting plate 12. The springs 96 and 98 are single-leaf flat springs, the ends of which engage fingers 100 projecting inwardly from the rims of the shoes. The center of each spring engages a projection 102 formed on the supporting plate. The springs 96 and 98 not only bias the shoes to released position, but, because they are located on the opposite side of the supporting plate from the shoe-guiding surfaces 32, they also urge the webs of the shoes into engagement with said shoe-guiding surfaces. The construction and arrangement of the single-leaf flat return springs 96 and 98 provide novel shoe-positioning means, which will constitute the subject matter of a separate application for patent.

The operation of the brake disclosed herein should be obvious from the preceding description. When hydraulic pressure is applied in the wheel cylinders 50 and 52 to spread the pistons 54, the shoes 14 and 16 will be urged outwardly into engagement with the braking flange 44 of the brake drum. If the brake drum is rotating in the counter-clockwise direction, shoe 14 will anchor at the left side of the brake, and shoe 16 will anchor at the right side of the brake, the shoes anchoring directly against the arms 22 and 24 of supporting plate 12. If, at the time of application, the drum is rotating in the clockwise direction, the shoes will anchor on the respective adjusting screws 78. Because the webs of the shoes lie in the same plane as supporting plate 12, the anchoring torque of the shoes has no tendency to twist or distort the supporting plate. It will be noted that the anchoring points of the shoes are spaced inwardly from the brake drum a greater distance than they would be if the anchoring torque was taken by the wheel cylinders. This increase in radial spacing of the shoe anchoring points from the drum augments the self-energization factor of the brake, owing to the greater tendency of the shoes to "wedge" between the anchors and the drum.

Although only one embodiment of the invention has been illustrated and described, various changes in the form and relative arrangements of the parts may be made to suit requirements.

I claim:

1. A brake, for use in cooperation with a rotatable drum, comprising a supporting plate which is adapted to be secured to a non-rotatable member and which has four radially-extending arms, two of which are shoe-anchoring arms, and two of which are shoe-guiding arms, said shoe-guiding arms being slightly offset axially from the rest of the supporting plate, said shoe-anchoring arms each having a notch formed in one side thereof, an internally-threaded bushing mounted in the notch of each shoe-anchoring arm, an adjusting screw associated with each bushing having a stem in threaded engagement with the bushing and a head arranged to anchor one end of one of the shoes, each of said bushings having peripheral slots which engage the sides of the respective notch in the supporting plate to prevent rotation of the bushing, two oppositely-disposed T-section brake shoes, each having a web engaging at an intermediate point one of the shoe-guiding arms of the supporting plate, and each when in released position having one end in anchoring engagement with the head of one of the adjusting screws and the other end in anchoring engagement with one side of one of the shoe-anchoring arms of the supporting plate, the webs of said shoes lying in the plane of the supporting plate, return springs biasing the shoes to released position, a cover plate adapted to be secured to a non-rotatable member and arranged to enclose the brake at the open side of the brake drum, two wheel cylinders secured to said cover plate and located at opposite sides of the brake between the ends of the shoes, and pistons in said wheel cylinders engaging the ends of the shoes to actuate the same.

2. A brake, for use in cooperation with a rotatable drum, comprising a supporting plate which is adapted to be secured to a non-rotatable member and which has two radially-extending shoe-anchoring arms, said shoe-anchoring arms each having a notch formed in one side thereof, an internally-threaded bushing mounted in the notch of each shoe-anchoring arm, an adjusting screw associated with each bushing having a stem in threaded engagement with the bushing and a head arranged to anchor one end of one of the shoes, each of said bushings having peripheral slots which engage the sides of the respective notch in the supporting plate to prevent rotation of the bushing, two oppositely-disposed T-section brake shoes, each when in released position having one end in anchoring engagement with the head of one of the adjusting screws and the other end in anchoring engagement with one side of one of the shoe-anchoring arms of the supporting plate, the webs of said shoes lying in the plane of the supporting plate, return springs biasing the shoes to released position, a cover plate adapted to be secured to a non-rotatable member and arranged to enclose the brake at the open side of the brake drum, two wheel cylinders secured to said cover plate and located at opposite sides of the brake between the ends of the shoes, and pistons in said wheel cylinders engaging the ends of the shoes to actuate the same.

3. A brake, for use in cooperation with a rotatable drum, comprising a supporting plate which has two radially-extending shoe-anchoring arms, said shoe-anchoring arms each having a notch formed in one side thereof, an internally-threaded bushing mounted in the notch of each shoe-anchoring arm, an adjusting screw associated with each bushing having a stem in threaded engagement with the bushing and a head arranged to anchor one end of one of the shoes, two oppositely-disposed T-section brake shoes, each when in released position having one end in anchoring engagement with the head of one of the adjusting screws and the other end in anchoring engagement with one side of one of the shoe-anchoring arms of the supporting plate, the webs of said shoes lying in the plane of the supporting plate, resilient means biasing the shoes to released position, a cover plate arranged to enclose the brake at the open side of the brake drum, and two hydraulic actuators secured to said cover plate and located at opposite sides of the brake between the ends of the shoes.

4. A brake, for use in cooperation with a rotatable drum, comprising a supporting plate which has two shoe-anchoring arms, an internally-threaded bushing mounted in one side of each shoe-anchoring arm, an adjusting screw associated with each bushing having a stem in threaded engagement with the bushing and a head arranged to anchor one end of one of the shoes, a resilient member associated with each shoe-anchoring arm serving to maintain the respective adjusting screw against accidental adjustment, two oppositely-disposed brake shoes, each when in released position having one end in anchoring engagement with the head of one of the adjusting screws and the other end in anchoring engagement with one side of one of the shoe-anchoring arms of the supporting plate, resilient means biasing the shoes to released position, a cover plate arranged to enclose the brake at the open side of the brake drum, and two hydraulic actuators mounted on said cover plate and located at opposite sides of the brake between the ends of the shoes.

5. A brake, for use in cooperation with a rotatable drum, comprising a supporting plate which has two shoe-anchoring arms, an adjusting screw mounted on one side of each shoe-anchoring arm, two oppositely-disposed brake shoes, each when in released position having one end in anchoring engagement with one of the adjusting screws and the other end in direct anchoring engagement with one side of one of the shoe-anchoring arms, resilient means biasing the shoes to released position, a cover plate arranged to enclose the brake at the open side of the brake drum, and two actuators mounted on said cover plate and located at opposite sides of the brake adjacent the outermost ends of the shoe-anchoring arms.

6. A brake comprising a supporting plate having two oppositely-extending shoe-anchoring arms, two oppositely-disposed brake shoes, each when in released position having one end in sliding engagement with each of said shoe-anchoring arms, a cover plate, and two actuators mounted on the cover plate and located at opposite sides of the brake between the ends of the shoes.

7. A brake comprising a supporting plate having a shoe-anchoring arm, two oppositely-disposed brake shoes, each when in released position having one end in sliding engagement with said shoe-anchoring arm, a cover plate, and an actuator mounted on the cover plate and located between the anchored ends of the shoes.

8. A brake comprising a supporting plate, two brake shoes, each when in released position having one end in sliding engagement with said supporting plate, a cover plate, and an actuator mounted on the cover plate and located between the anchored ends of the shoes.

9. A brake, for use in cooperation with a rotatable drum, comprising a supporting plate which is adapted to be secured to a non-rotatable member and which has two radially-extending shoe-anchoring arms, said shoe-anchoring arms each having a notch formed in one side thereof, an internally-threaded bushing mounted in the notch of each shoe-anchoring arm, an adjusting screw associated with each bushing having a stem in threaded engagement with the bushing and a head arranged to anchor one end of one of the shoes, each of said bushings having peripheral slots which engage the sides of the respective notch in the supporting plate to prevent rotation of the bushing, two oppositely-disposed T-section brake shoes, each when in released position having one end in anchoring engagement with the head of one of the adjusting screws and the other end in anchoring engagement with one side of one of the shoe-anchoring arms of the supporting plate, the webs of said shoes lying in the plane of the supporting plate, return springs biasing the shoes to released position, and brake shoe actuating mechanism connected between adjacent ends of the brake shoes.

10. A brake, for use in cooperation with a rotatable drum, comprising a supporting plate which is adapted to be secured to a non-rotatable member and which has two radially-extending shoe-anchoring arms, said shoe-anchoring arms each having a notch formed in one side thereof, an internally-threaded bushing mounted in the notch of each shoe-anchoring arm, an adjusting screw associated with each bushing having a stem in threaded engagement with the bushing and a head arranged to anchor one end of one of the shoes, each of said bushings having peripheral slots which engage the sides of the respective notch in the supporting plate to prevent rotation of the bushing, an adjustor retaining spring clamped on said bushing to hold said adjusting screw against accidental adjustment, two oppositely-disposed T-section brake shoes, each when in released position having one end in anchoring engagement with the head of one of the adjusting screws and the other end in anchoring engagement with one side of one of the shoe-anchoring arms of the supporting plate, the webs of said shoes lying in the plane of the supporting plate, return springs biasing the shoes to released position, and brake shoe actuating mechanism connected between adjacent ends of the brake shoes.

11. For use in a brake, a supporting plate having two radial oppositely-projecting shoe-anchoring arms and two radial oppositely-extending lateral shoe guiding surfaces, and a pair of brake shoe actuators, each being mounted adjacent the outermost end of a corresponding shoe-anchoring arm, the imaginary line of actuator thrust lying in the plane of said supporting plate.

12. For use in a brake, a supporting plate having a radially-projecting shoe-anchoring arm and a radially-extending lateral shoe-guiding surface, and a shoe spreading device mounted adjacent the outermost end of said shoe-anchoring arm with the imaginary line of shoe-spreading thrust lying in the plane of said supporting plate.

13. For use in a brake, a supporting plate having two radial oppositely-projecting shoe-anchoring arms, said shoe-anchoring arms each having a notch formed in one side thereof, and a bushing having a longitudinal recess in its outer periphery carried in each notch with the sides of the recess engaging the sides of the respective notch.

14. For use in a brake, a supporting plate having two radial oppositely-projecting shoe-anchoring arms, said shoe-anchoring arms each having a notch formed in one side thereof, a bushing having a longitudinal recess in its outer periphery carried in each notch with the sides of the recess engaging the sides of the respective notch, and a brake shoe adjustor adjustably associated with each bushing.

15. A brake, for use in cooperation with a rotatable drum and a non-rotatable mounting member, comprising a supporting member which is secured directly to the mounting member, two brake shoes, each one in released position having one end in sliding engagement with said supporting member, a cover member which is secured directly to said mounting member, and an actuator mounted on the cover member and located between the anchored ends of the shoes.

BRYAN E. HOUSE.

REFERENCES CITED

The following references are of record in the file of this patent:

UNITED STATES PATENTS

| Number | Name | Date |
| --- | --- | --- |
| 2,166,157 | Jones et al. | July 18, 1939 |
| 2,197,452 | Fussell, Jr. | Apr. 16, 1940 |
| 2,246,242 | Chase | June 17, 1941 |